United States Patent [19]

Schmidt et al.

[11] Patent Number: 4,938,578
[45] Date of Patent: Jul. 3, 1990

[54] TRUNCATED MIRROR SURFACE

[75] Inventors: William P. Schmidt, Rockwood; Frank D. Hutchinson, New Boston, both of Mich.

[73] Assignee: Mirror Lite Company, Rockwood, Mich.

[21] Appl. No.: 254,027

[22] Filed: Oct. 6, 1988

[51] Int. Cl.⁵ .............................................. G02B 5/10
[52] U.S. Cl. ..................................... 350/629; 350/632; 248/479
[58] Field of Search ............... 350/629, 625, 627, 632; 248/487, 479, 476

[56] References Cited

U.S. PATENT DOCUMENTS

| | | | |
|---|---|---|---|
| 4,013,351 | 3/1977 | Haile | 350/632 |
| 4,436,372 | 3/1984 | Schmidt et al. | 350/629 |
| 4,500,063 | 2/1985 | Schmidt et al. | 241/475.1 |

Primary Examiner—Bruce Y. Arnold
Assistant Examiner—Jay Ryan
Attorney, Agent, or Firm—Arnold S. Weintraub; Gerald R. Black

[57] ABSTRACT

A mirror assembly for mounting onto an exterior front surface of a vehicle, preferably one on each opposed front fender of the vehicle. The mirror assembly includes a mirror having a reflective surface, the surface having a generally convex geometry, and being in the shape of an ellipsoid. The reflective surface provides the driver with a field of view along the vertical axis is in the range of 180° to 220°. The top portion of the reflective surface has a first plane of truncation which passes through the approximate center of the reflective surface. The rear portion of the reflective surface has a second plane of truncation which removes at least the rear half of the surface. This second plane is essentially normal to the first plane of truncation. The reflective surface is mounted with a slight upward tilt.

19 Claims, 3 Drawing Sheets

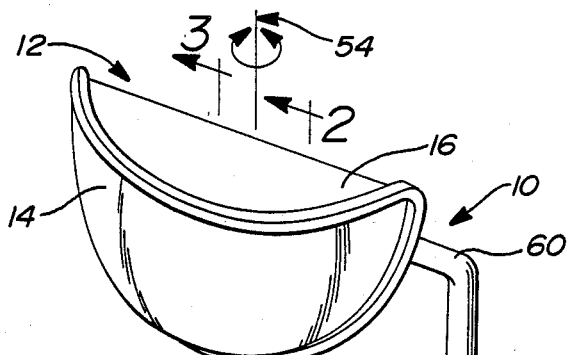
*Fig-1*
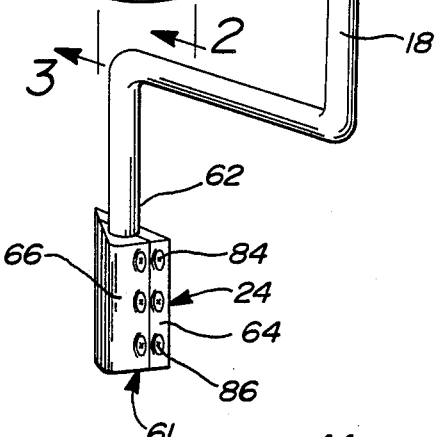
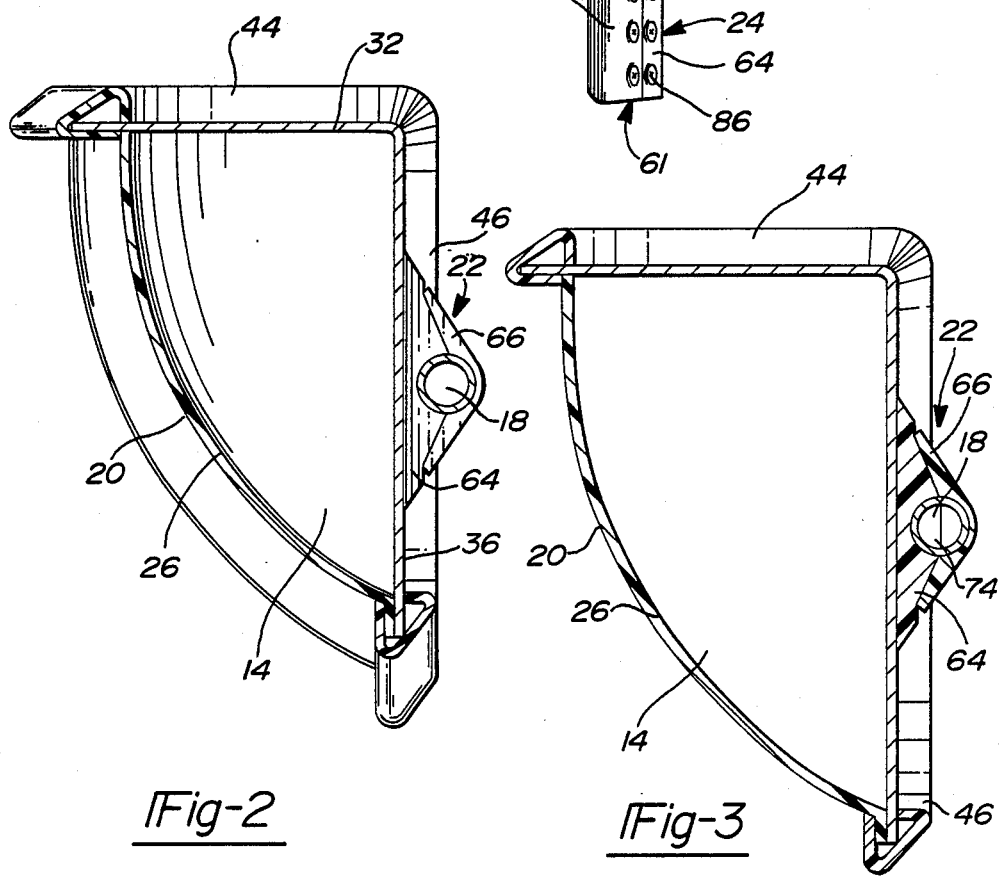
*Fig-2*  *Fig-3*

TRUNCATED MIRROR SURFACE

BACKGROUND OF THE INVENTION

1. Field of the Invention

The present invention relates to mirror assembly for mounting onto a vehicle, and more particularly, to a mirror assembly having an ellipsoidal-shaped reflective surface, such that when two mirror assemblies are mounted on each front fender of the vehicle, the driver has a complete field of vision of the front and both sides of the vehicle.

2. Background Art

The National Safety Council has reported that 58,000 school bus accidents occurred in 1977 and 1978. It has been estimated that in a majority of these accidents the accident occurs when the school bus strikes the child who is boarding or departing from the vehicle. Most of the children injured by these buses are struck by the front wheels.

U.S. Pat. No. 4,436,372, entitled "Elliptical Mirror for Vehicular Use", by W. P. Schmidt and F. D. Hutchinson, discloses a major advance in improving the field of view of drivers of large vehicles, such as school buses. By employing a pair of elliptical mirrors on the front of the vehicle, blind spots around the vehicle can be substantially reduced. The patent is herewith incorporated into this specification by reference.

U.S. Pat. No. 4,730,914 by Stout et al discloses a variation of the Schmidt and Hutchinson design. Although an irregularly shaped convex mirror with a plurality of radii of curvature is disclosed, the preferred design is a sphere having a ten inch radius of curvature.

Even a minor reduction in the size of the "blind spots" is important, since children's lives are involved.

SUMMARY OF THE INVENTION

The primary advantage of the mirror assembly of the present invention is that it reduces dramatically the size of the "blind spots" behind the mirror assembly.

Another advantage of the mirror assembly of the present invention is that it enhances the field of view and the visibility about the vehicle.

The mirror assembly of the present invention preferably is mounted onto each front fender of the vehicle. Although the mirror assembly is designed to improve the field of view of a school bus, the mirror assemblies can be readily adapted for use on any larger vehicles, including but not limited to cars, station wagons, trucks, trailers, trains, recreational vehicles, aircraft, boats, and the like. The reflective surface of the mirror has a generally convex geometry, and preferably has the shape of a portion of an ellipsoid. As used herein the term "ellipsoid" refers to a solid geometric shape having a section which is essentially elliptical in shape. The ellipsoid of the present invention preferably has a variable radius of curvature across the entire surface thereof. The reflective surface provides a field of view along the vertical axis normal to the driver's line of sight to the reflective surface of about from 180° to 220°.

The reflective surface is defined by truncating a first plane through the ellipsoid. The first plane removes a major portion of the top of the ellipsoid, resulting in the reflective surface having a generally flattened top portion. The reflective surface is further defined by truncating a second plane through the ellipsoid. The second plane is essentially normal to the first plane, and removes the rear half portion of the ellipsoid. The reflective surface is mounted with a slight upward tilt.

The diameter of the mirror disclosed in U.S. Pat. No. 4,436,372 is preferably about eight (8) inches. The preferred diameter of the mirror of the present invention is about twelve (12) inches. By thus increasing the diameter, the driver is provided with a larger image on the reflective surface, and a better view of the front wheels on both sides of the vehicle. By changing the shape of the reflective surface from an ellipsoid (U.S. Pat. No. 4,436,372) to a semi-ellipsoid, it is possible to lower the mirror mounting position on each of the front fenders by about three (3) inches. The size of the "blind spot" is thereby dramatically reduced by about 100%. By having an essentially flat top surface, the blind spot behind each mirror is lowered, while the reflective image on the mirror surface is enlarged because of the increased diameter.

The mirror assembly is preferably mounted onto the fender of the vehicle, but may be easily adapted to any convenient part of the vehicle, such as a door panel, or a side panel thereof.

For a more complete understanding of the mirror surface of the present invention, reference is made to the following detailed description and accompanying drawings in which the presently preferred embodiment of the invention is illustrated by way of example. It is expressly understood, however, that the drawings are for purposes of illustration and description only, and are not intended as a definition of the limits of the invention. Throughout the following description and drawings, identical reference numbers refer to the same component throughout the several views.

BRIEF DESCRIPTION OF THE DRAWINGS

FIG. 1 depicts the mirror assembly of the present invention;

FIG. 2 is a sectional view of the mirror of the present invention as depicted in FIG. 1 taken along Section 2—2;

FIG. 3 is a sectional view of the mirror of the present invention as depicted in FIG. 1 taken along Section 3—3;

DETAILED DESCRIPTION OF THE INVENTION

Figure 4:
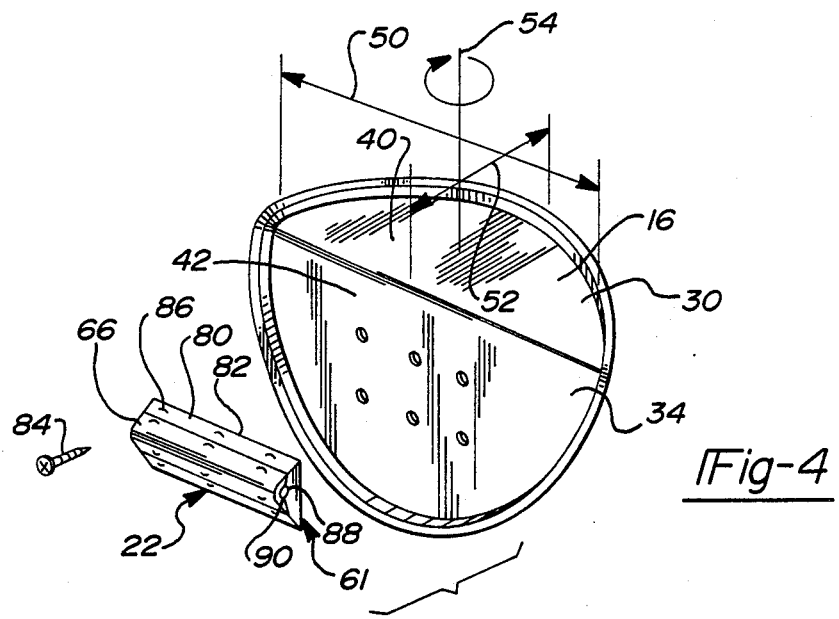
FIG. 4 is a rear perspective view of the mirror assembly shown in FIG. 1, depicting the mounting frame and the mounting bracket.

Referring now to the drawings, FIG. 1 depicts a front perspective view of the mirror assembly 10 of the present invention. The mirror assembly 10 includes a mirror 12 having a reflective surface 14 with a generally convex shape throughout, a frame 16 secured to the reflective surface 14, a tubular member 18 being attached to a fender and the frame 16, and means 24 for mounting the tubular member 18 to the vehicle (not shown). The mirror 12 is mountable onto an exterior front surface of a vehicle. Preferably, two of the mirror assemblies 10 are mounted on the vehicle; one each on the right and on the left front fenders in such a manner that the "blind spot" behind each mirror 12 is fully disclosed in the other mirror.

As seen in FIG. 2 and 3, which are sectional views from FIG. 1, the mirror 12 has a transparent outer surface 20 formed thereon. Preferably, the transparent outer surface 20 is made of acrylic plastic. The transparent outer surface 20 is about 0.125 inches thick. The mirror 12 has a curved inner liner 26 which is coated with a light reflective coating, such as about 0.7 mils thick to form an ellipsoidal-shaped light reflecting surface. The light reflective coating may be formed by aluminum deposition on the inner liner.

The mirror 12 has a reflective surface 14 having a generally ellipsoidal shape. The reflective surface 14 is defined by truncating a first plane 30 therethrough. The first plane 30 removes a significant portion of the top of the reflective surface 14 (preferably, passing through the center of the ellipsoid), resulting in the reflective surface 14 having a generally flattened top portion 32. The reflective surface 14 is further defined by truncating a second plane 34 through the ellipsoidal mirror 12. The second plane 34 is essentially normal to the first plane 30 of truncation, and preferably removing the rear half portion 36 of the mirror.

As shown in FIG. 4, the mirror frame 16 has two essentially flat surfaces 40 and 42, each of which are substantially coplanar with both the first plane 30 and the second plane 34. The frame 16 has a first gasket 44 extending continuously beyond and around the top portion 40 of the reflective surface, and the frame 16 has a second gasket 46 extending continuously beyond the rear portion 42 of the reflective surface 14. The gaskets 44 and 46 are preferably formed with the same material as the outer surface 20 and is integral with the body of the mirror. The gaskets 44 and 46 are preferably made of a rubber or vinyl, or made of a metal and coated with rubber or vinyl.

Although the reflective surface 14 may be any geometric shape having a plurality of radii of curvature, preferably, the reflective surface 14 is generally the shape of a portion of an ellipsoid. It has been found that any ellipsoid provides a full field of view with minimal distortion. The first plane 30 and the second plane 3A will reduce the surface area of the reflective surface to about one quarter of the total surface area of the ellipsoid. The diameter 50 of the reflective surface is normal to the height 52 or H of the reflective surface. The reflective surface provides the driver with a field of view which is in the range of from 180° to 220°.

Figure 5:
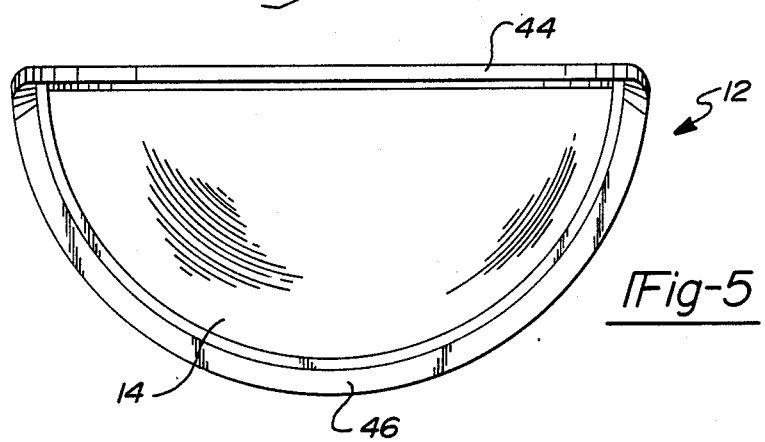
FIG. 5 is a front view of the reflective surface of the mirror and the mounting frame depicted in FIG. 1.

The reflective surface 14 is mounted with a slight upward tilt. The tilt enables the flat top surface 40 of the mirror to be in substantial alignment with the line of sight of the driver. The rear portion of the reflective surface has a second plane of truncation. As shown in FIG. 5, the section formed by the second plane of truncation has the shape of a semicircle. This ratio of the diameter 50 to the height 52 or H is in the range of 2.0 to 6.0.

Figure 6:
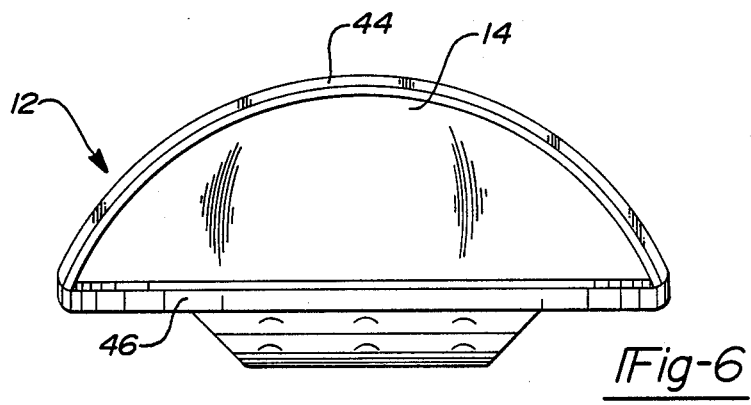
FIG. 6 is a bottom view of the reflective surface of the mirror and the mounting frame as depicted in FIG. 1.

FIG. 6 is a bottom view of the reflective surface of the mirror and has the general shape of an ellipse. The elliptical convex reflector surface 14 has its focal points located on the diametrical plane of the major axis. The reflector surface 14 includes a first, a second, and a third reflector surface portions which each correspond to a different radius of curvature of the ellipsoid.

The mirror 12 produces a continuous image to a viewer who is positioned in alignment therewith, which is larger in the center and smaller near the edges thereof. The surface 14 produces no severe distortion and the viewer is able to overcome the partial distortions caused by the different radii of curvature and interpret the image formed thereon.

The rigid tubular member 18 has an upper portion 60 and a lower portion 62. The upper portion 60 of the tubular member is attached to the fender and the mirror frame 16. The tubular member 18 extends about the fender in such a manner that the reflective surface 14 is visible to the driver when the driver is seated in a position behind the steering wheel. The tubular member 18 has a plurality of radical bends 59 therein, to insure the proper positioning of the reflective surface. A radical bend 59 is an angle of 90° or more. The tubular member 18 serves to damp the vibration of the mirror 12 during vehicle movement. The radical bends 59 separate the mirror vibrations which would otherwise impair the driver's vision. The mirror assembly 10 is preferably mounted even with the hood line of the vehicle for purposes of ballast. The center of gravity of the mirror assembly 10 preferably lies within the tubular member 18 which serves to balance the assembly 10, and minimize vibration of the assembly 10 caused by movement of the vehicle.

The mirror assembly 10 of the present invention also includes a mounting means 24 and an attaching means 22. U.S. Pat. No. 4,500,063 entitled "Fender Mount for a Mirror," by W. P. Schmidt and F. D. Hutchinson, discloses a major advance in mounting these mirrors onto a vehicle, the patent being herewith incorporated into this specification by reference. The mount 61 disclosed in this patent is preferably the mounting means 24 and the attaching means 22.

The mount 61 can similarly be used for securing to flat surfaces, by using a base member 80 having a flattened mounting surface 82. The mount 61 is preferably used to attach the mirror frame 16 to the tubular member 18 as shown in FIG. 4.

To affix the mount 61 to either the vehicle or to the mirror frame 16, the base member is located thereon in the desired position, and secured thereto by threaded fasteners 84, which are inserted into apertures 86 disposed thereon. The tubular member 18 is inserted into the longitudinal groove 88 within the base member. The cover member 66 is inserted onto the base member and the tubular member, the longitudinal groove 90 in the cover member cooperating with the opposed longitudinal groove 88 in the base member to secure the tubular member 18, as additional threaded fasteners 84 are secured into additional apertures 86 in the cover member 66.

Figure 7:
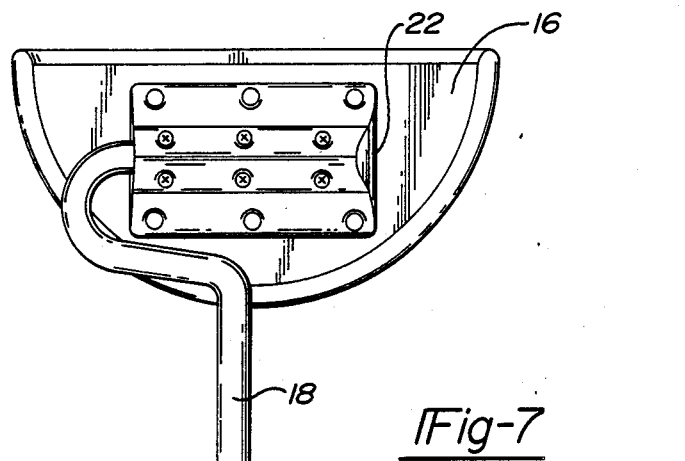
FIG. 7 depicts a perspective view of the preferred embodiment of the mirror assembly of the present invention.
Figure 8:
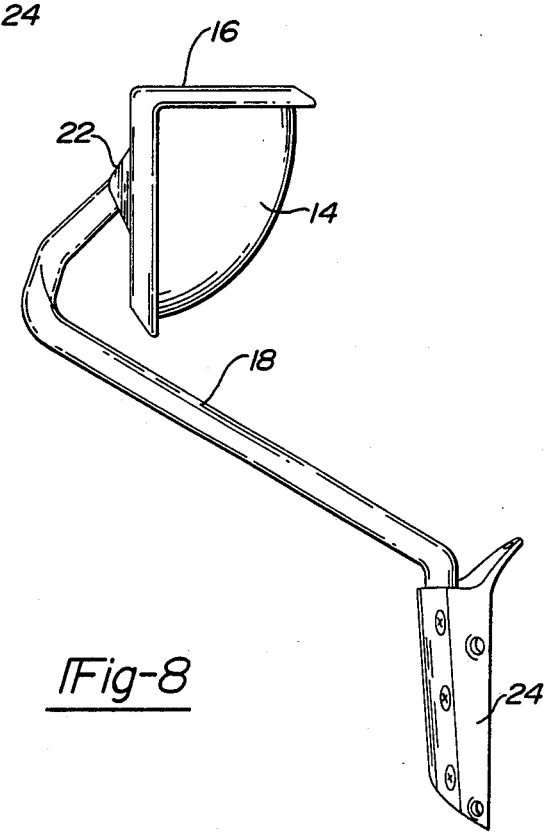
FIG. 8 depicts another perspective view of the preferred embodiment depicted in FIG. 7.

FIGS. 7 and 8 depict the preferred embodiment of the mirror assembly 10. The tubular member 18 is U-shaped just before the junction with the frame mounting means 22. The tubular member 18 has a radical bend as it crosses the proximate center of the reflective surface 14 and is slanted inward and downward toward the vehicle mounting means 24.

While the mirror assembly has been described in conjunction with a specific embodiment, it is evident that many alternatives, modifications, and variations will be apparent to those skilled in the art in light of the disclosure herein. It is intended that all such alternatives, modifications, and variations are included herein that fall within the spirit and scope of the appended claims.

We claim:

1. A mirror for mounting onto an exterior front surface of a vehicle, the mirror serving to broaden the field of view for a driver, the mirror having a reflective surface with a generally convex shape throughout, the reflective surface being generally in the shape of a portion being less than half of an ellipsoid, the reflective surface having an apex and a diameter, the apex being a point removed from the diameter the reflective surface having a first radius of curvature and a second radius of curvature, the first radius of curvature being different from the second radius of curvature, the reflective surface providing the driver with a field of view which is greater than 180° about an axis.

2. The mirror of claim 1, wherein the reflective surface is mountable between two gaskets, the first gasket generally defining a first plane, the second gasket generally defining a second plane, the second plane intersecting the first plane.

3. The mirror of claim 2, wherein the first plane is normal to the second plane.

4. The mirror of claim 1, wherein one of the gaskets is generally in the shape of a semicircle.

5. The mirror of claim 1, wherein the ratio of the diameter of the surface to the apex is greater than 2.0 but less than 6.0.

6. The mirror of claim 1, wherein the field of view of the reflective surface along the vertical axis is in the range of 180° to 220°.

7. A mirror for mounting onto an exterior front surface of a vehicle, the mirror broadening the field of view for a driver, the mirror having a reflective surface with a generally convex shape throughout, the reflective surface being generally in the shape of one fourth of an ellipsoid, the field of view of the ellipsoid along the vertical axis being in the range of 180 to 220 degrees.

8. The mirror of claim 7, wherein the surface has an apex and a diameter, the diameter being a longest straight line segment that passes through any two points on the ellipsoid surface, the apex bisecting the diameter, the apex extending from the diameter to the surface of the ellipsoid, the ratio of the diameter to the apex being greater than 2.0 but less than 6.0.

9. A mirror assembly for a vehicle, the mirror assembly having a center of gravity, the vehicle having a front and two sides, the mirror assembly enabling the driver to have a complete field of view about the front and two sides of the vehicle, the assembly comprising:
(a) a mirror having a reflective surface with a generally convex shape throughout, the reflective surface being essentially in the shape of one-fourth of an ellipsoid, the reflective surface providing the driver with a field of view in the range of 180 to 220 degrees:
(b) a frame secured to the reflecting surface:
(c) a rigid, tubular member being attached to a fender and the frame, the tubular member extending above the fender in such a manner that the reflective surface is visible to the driver when the driver is seated in a position behind the steering wheel:
(d) a base mounting member being affixed to the frame, and a cover member being secured to the base member, there being a longitudinal bore between the cover member and the base member which accepts and secures the rigid tubular member, the cover member being adjustable relative to the base member to enable a repositioning of the tubular member therebetween: and
(e) means for mounting the tubular member to the vehicle.

10. The mirror assembly of claim 9, wherein the tubular member has a plurality of radical bends therein.

11. The mirror assembly of claim 9, wherein the mounting means comprises: a base mounting member being affixed to the vehicle, and a cover member being secured to the base member, there being a longitudinal bore between the cover member and the base member which accepts and secures the rigid tubular member, the cover member being adjustable relative to the base member to enable a repositioning of the tubular member therebetween.

12. The mirror assembly of claim 9, wherein the frame has a first flange extending continuously beyond the reflective surface, and the frame has a second flange extending continuously beyond the reflective surface.

13. The mirror assembly of claim 9, wherein the reflective surface of the mirror is mounted relative to the vehicle with a slight upward tilt, the tilt thereby enabling the flat top surface to be in substantial alignment with the line of sight of the driver.

14. The mirror assembly of claim 9, wherein the center of gravity of the assembly lies within the tubular member.

15. A mirror mounting assembly for mounting a mirror assembly to a vehicle, the mirror mounting assembly having a center of gravity, the vehicle having a front, two sides, and a steering wheel, the mirror assembly enabling the driver to have a complete field of view about the front and two sides of the vehicle, the assembly comprising:
(a) a rigid, tubular member having two ends, the tubular member having a plurality of radical bends therein, the tubular member damping vibration of the mirror assembly during movement of the vehicle, the tubular member extending above the fender in such a manner that the reflective surface is visible to the driver when the driver is seated in a position behind the steering wheel;
(b) a mirror having a reflective surface with a generally convex shape throughout, the reflective surface being essentially in the shape of one-fourth of an ellipsoid, the top portion of the ellipsoid being truncated;
(c) means for attaching the first end of the tubular member to the mirror assembly, the attaching means including a first base mounting member being affixed to the mirror assembly, and a cover member being secured to the base member, there being a first longitudinal bore between the first cover member and the first base member which accepts and secures the rigid tubular member therebetween, the first cover member being adjustable relative to the first base member to enable a repositioning of the tubular member therebetween; and
(d) means for mounting the second end of the tubular member to the vehicle, the mounting means including a second base mounting member being affixed to the vehicle, and a second cover member being secured to the second base member, there being a second longitudinal bore between the second cover member and the second base member which accepts and secures the rigid tubular member therebetween, the second cover member being adjustable relative to the second base member to enable a repositioning of the tubular member therebetween.

16. The mirror mounting assembly of claim 15, wherein the center of gravity of the assembly lies within the tubular member.

17. A mirror for mounting onto an exterior front surface of a vehicle, the mirror serving to broaden the field of view for a driver, the mirror having a reflective surface with a generally convex shape throughout, the reflective surface having an apex and a diameter, the apex being a point removed from the diameter, the reflective surface having a first radius of curvature and a second radius of curvature, the first radius being different from the second radius of curvature, the reflective surface being mountable between two gaskets, the first gasket generally defining a first plane, the second gasket generally defining a second plane, the second plane intersecting the first plane.

18. The mirror of claim 17, wherein the reflective surface providing the driver with a field of view which is greater than 180 degrees about an axis.

19. The mirror of claim 18, wherein the first plane is normal to the second plane.

* * * * *